United States Patent [19]

Kayanuma

[11] 4,162,398
[45] Jul. 24, 1979

[54] BIAS CONTROL CIRCUIT FOR LIGHT MODULATORS

[75] Inventor: Kanji Kayanuma, Yokohama, Japan

[73] Assignee: Victor Company of Japan, Limited, Yokohama, Japan

[21] Appl. No.: 832,892

[22] Filed: Sep. 13, 1977

[30] Foreign Application Priority Data

Sep. 14, 1976 [JP] Japan .............................. 51-110056

[51] Int. Cl.² .............................................. G01J 1/32
[52] U.S. Cl. .................................... 250/205; 358/128
[58] Field of Search ................ 250/199, 205; 358/128

[56] References Cited
FOREIGN PATENT DOCUMENTS 974322 9/1975 Canada ................................ 250/199 X Primary Examiner—Lawrence J. Dahl
Attorney, Agent, or Firm—Fleit & Jacobson

[57] ABSTRACT

A bias control circuit for light modulator includes a feedback control loop through which a measure of the modulated laser beam is processed to derive an error correction signal which is superimposed on the normal bias potential to shift the bias point in the same direction as the direction of shift of the operating curve of the light modulator due to the heat generated therein during operation. A feed-forward control loop is also provided to cancel an error signal in the feedback control loop resulting from an intentional gradial variation of the laser beam intensity prior to the modulation so that the average light intensity of the modulated laser beam is correspondingly varied.

8 Claims, 5 Drawing Figures

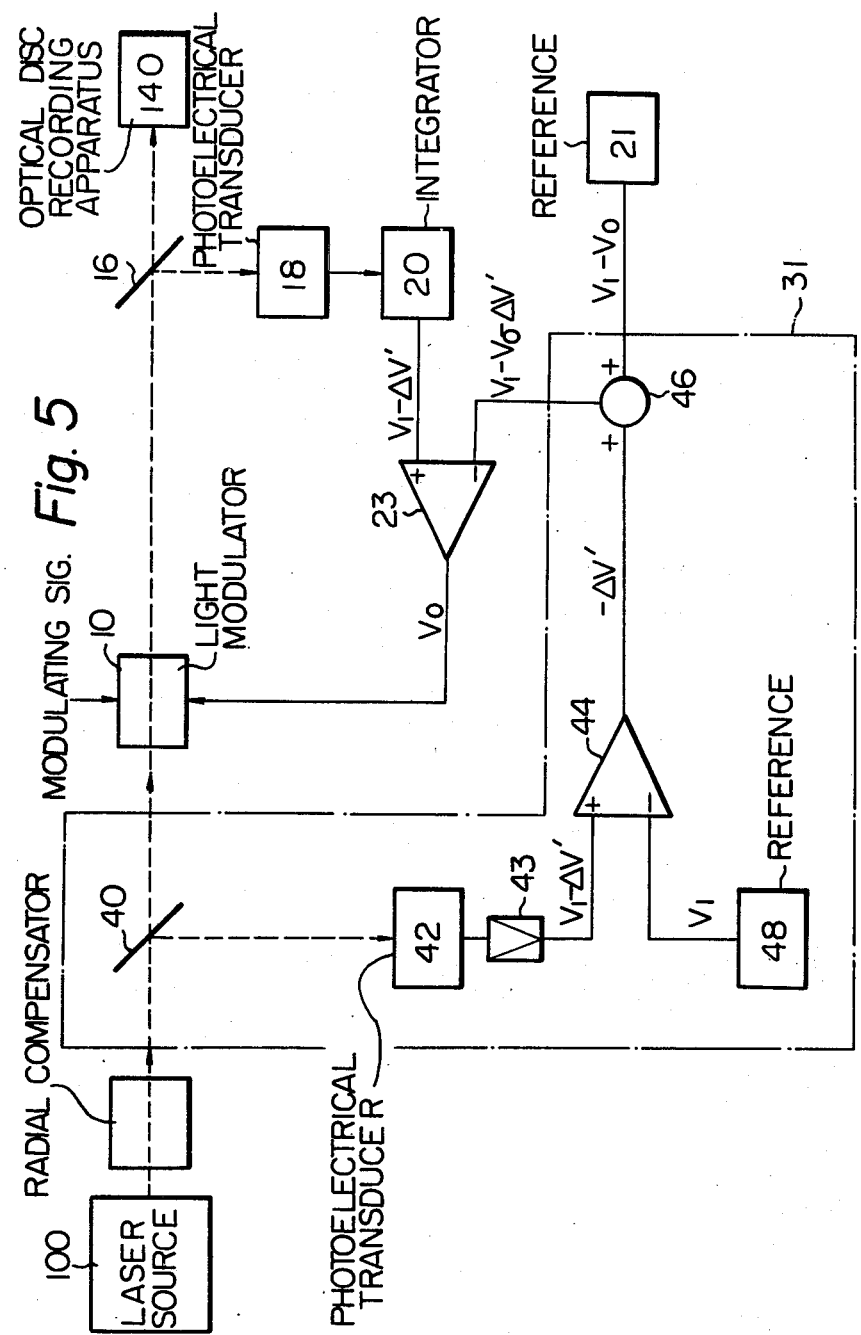

BIAS CONTROL CIRCUIT FOR LIGHT MODULATORS

FIELD OF THE INVENTION

The present invention relates generally to light modulators and particularly to a circuit arrangement for controlling the bias potential of the light modulator in relation to varying operating characteristics thereof.

BACKGROUND OF THE INVENTION

The modulated light energy of known electrooptical light modulating devices varies sinusoidally as a function of the amplitude of an applied voltage signal. Practically, only a portion of the sinusoidal curve is utilized for intensity modulation. However, the electrooptical characteristic of the light modulators is liable to vary as a function of the heat generated in the device during operation due to the passing light energy so that the operating curve is caused to shift and consequently the biasing point of the modulator drifts from the previous operating point. This results in a variation of the mean-value energy of the modulated light beam as well as in the degree of intensity modulation. To keep the degree of modulation constant, peak detectors may be used to detect the positive and negative peak values of the modulating signal. However, peak detection is difficult to achieve if the frequency of the modulation signal is high.

SUMMARY OF THE INVENTION

An object of the present invention is to compensate for the varying operating characteristic of electrooptical light modulators to stabilize the mean-value energy of an intensity modulated laser beam and its degree of modulation.

The present invention contemplates the use of a feedback control loop which includes a half-silvered mirror disposed in the path of the modulated laser beam to reflect some of the passing beam to a photoelectrical transducer. The output of the transducer is a measure of the light transmitted to a recording apparatus and applied to an integrator whose output is a time integral or mean-value representation of the intensity of the output beam. The integrator output is processed to derive a signal which is a time integral representation of the normal biasing potential plus an error correction potential, which correction signal shifts the bias point in the same direction as the direction of shift of the operating curve of the light modulator.

Optical recording involves the use of a mechanism that directs the beam of intensity-modulated light to a light sensitive disc and drives it with respect to the incident beam so that information is recorded in a spiral track. In the optical disc recording, a method called "radial compensation" is employed to decrease the average light energy of the incident beam as the point of incidence moves radially toward the center of the disc so that the average light energy density is held constant over the entire length of the track.

When the feedback-controlled light modulator is employed for optical disc recording, the bias control point will be automatically shifted in such manner that the average light energy may be held constant by the feedback control operation so that the information is recorded at a higher light energy density in the inner portion of the disc than in the outer portion.

The present invention further contemplates the use of a feed-forward control loop which includes a second half-silvered mirror disposed in the path of the laser beam prior to incidence on the light modulator to reflect some of the passing beam to a second photoelectrical transducer where the incident beam is converted into electrical signal representing the average light energy of a "radially compensated" laser beam. This signal is compared with a fixed reference representing the normal integrator output when the light modulator is operated at the normal biasing potential to provide a signal indicative of the difference between them, which difference signal is combined with the feedback control signal to offset the feedback signal that shifts the biasing point, so that the average light energy decreases in response to the amount of decrease in the average light energy of the "radially compensated" beam.

BRIEF DESCRIPTION OF THE DRAWINGS

The invention will be further described with refernece to the accompanying drawings, in which:

FIG. 5 is a circuit diagram of a second embodiment of the invention.

DESCRIPTION OF THE PREFERRED EMBODIMENTS

Figure 1:
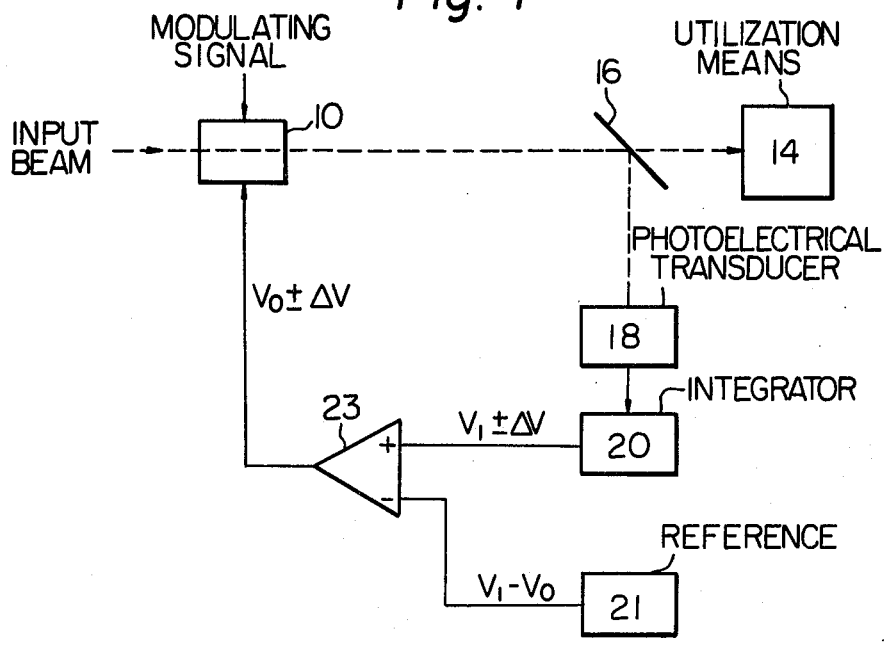
FIG. 1 is a circuit block diagram of an embodiment of the invention in which the bias control point of a light modulator is feedback-controlled.

In FIG. 1 a light modulator 10 is shown disposed in the path of a laser beam emitted from a laser (not shown) for modulating the intensity of the passing beam with a modulating signal applied thereto over lead 12. The modulating signal may be an audio/video signal which will be recorded on spiral tracks of a light-sensitive disc by means of a utilization means, or optical disc recording apparatus. In the path of the modulated beam between the modulator 10 and the utilization means 14 is disposed a half-silvered mirror 16 positioned at 45° to reflect some of the incident light energy to a photoelectrical transducer 18 where the incident light is converted into corresponding electrical signal and transmit and substantial part of the passing light energy to the utilization means 14. The signal from the transducer 18 is coupled to an integrator 20. This integrator has a time constant value which is sufficient to cover a time interval associated with the lowest frequency of the modulating signal under consideration, so that the output from the integrator 20 represents the mean value of the modulated light energy. When the light modulator 10 is operating at a normal biasing potential $V_0$, the output from the integrator 20 will assume a voltage $V_1$ which corresponds to the average light energy $L_1$ illustrated in FIG. 2.

The output from the integrator 20 is fed into the noninverting input of a comparator 23 for comparison with a fixed reference potential $V_1 - V_0$ at the inverting input supplied from a source 21. Assuming that the light modulator 10 is operating under normal conditions in which the operating curve is as indicated at a in FIG. 2, the modulated laser beam will have an amplitude as indicated at 32a with an average light energy $L_1$. This light energy is converted into corresponding electrical value $V_1$ by the integrator 20 so that the output of comparator 23 is $V_0$, which output is applied to the light modulator 10 as a biasing potential.

Assuming that the operating characteristic of the light modulator has changed due to the heat accumulated therein by the passing laser beam so that its operating characteristic curve has shifted to the right along the axis of the modulating voltage so that the operating characteristic is exhibited by curve b. With the operating bias potential at $V_0$, the shifting of the operating characteristic curve to the right will cause the average laser energy to increase by an amount $\Delta L$ to $L_2$. This increase in average light energy results in a voltage signal $V_1+\Delta V$ from the integrator 20 so that the output from the comparator 23 is $V_0+\Delta V$. Thus the biasing potential or control point of the light modulator is shifted by an amount $\Delta V$ and through the feedback action will eventually settle to a point which corresponds to the operating point of the curve b. It is thus seen that when the operating curve has shifted to the left, a compensating voltage of negative polarity will be generated to shift the operating point to the left.

Since feedback control operation tends to introduce an overshoot which causes an osillcation to occur within the feedback control loop, the integrator 20 should preferably be designed so that its time constant value is greater than the time interval associated with the frequency of the control oscillation in order to suppress the oscillation.

Figure 2:
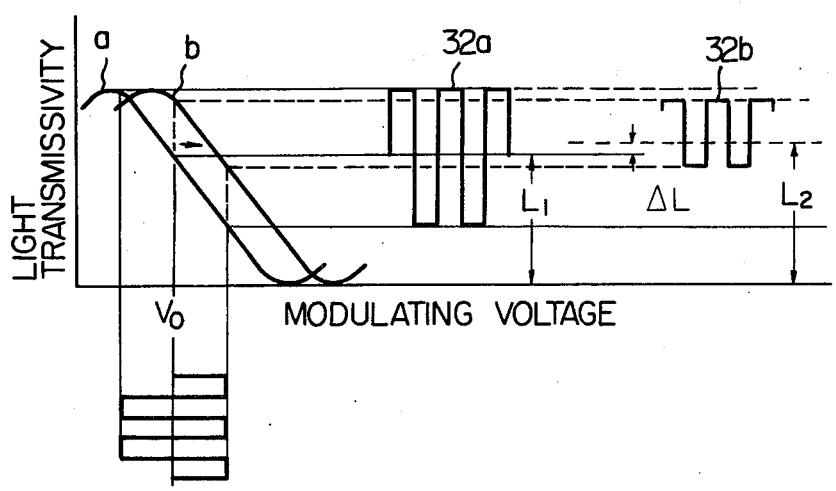
FIG. 2 is a graphic representation of an operating characteristic of the light modulator of FIG. 1.
Figure 3:
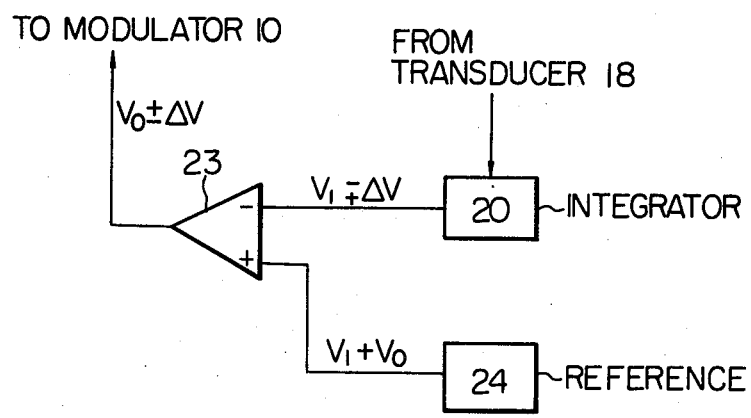
FIG. 3 is a modification of the circuit of FIG. 1.
Figure 4:
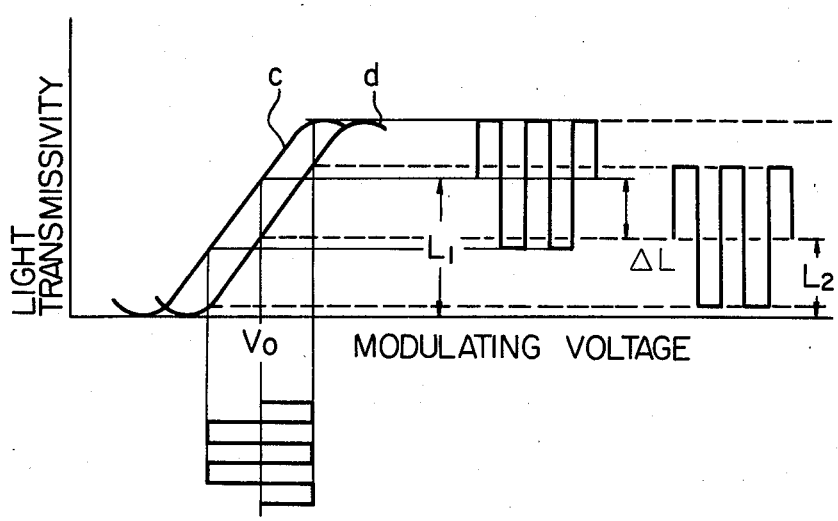
FIG. 4 is a graphic representation of the operating characteristic of the light modulator of FIG. 3.

The operating characteristic of the light modulator 10 may be as shown in FIG. 4 in which the slope of the curve is opposite to that of the curve of FIG. 2. FIG. 3 illustrates a modification of the embodiment of FIG. 1 in which the feedback control is to derive a correction signal whose polarity is such as to decrease the biasing potential in response to the decrease in integrator output. In FIG. 3 the integrator 20 supplies its output to the inverting input of the comparator 23 rather than the noninverting input and a reference circuit 24 provides a voltage reference $V_1+V_0$ to the noninverting input of the comparator. The comparator 23 computes the difference between the two input voltage signals.

Curve c in FIG. 4 depicts the normal operating characteristic of the light modulator 10. If it is assumed that the curve has shifted to a position as depicted by curve d, the mean-value energy of the modulated laser beam will decrease from $L_1$ to $L_2$ so that the integrator output is $V_1-\Delta V$. Thus, the output from the comparator 23 is $V_0+\Delta V$ in which $\Delta V$ is the error correction signal which shifts the operating point of the light modulator in the same direction as the shifting of the curve.

If the laser beam incident on the light modulator 10 has a gradual decrease in intensity with time, the embodiment of FIG. 1 will cause the integrator 20 to generate a decreasing potential. This results in the comparator 23 generating a decreasing bias potential which in turn shifts the bias point to the left so that the average light energy, and hence the integrator output increases until the integrator output reaches the previous value. Therefore, the bias point is maintained at the normal control point regardless of the decrease in average light energy. This is a disadvantage for applications where the laser beam is intentionally decreased in intensity with time in relation to the position of the information-carrying laser beam incident on the light-sensitive record disc to keep the average light energy density constant over the entire length of the record track.

The embodiment of FIG. 1 is modified in a manner as shown in FIG. 5 to eliminate the disadvantage discussed above. In FIG. 5, the same reference numerals are used to indicate the parts common to the embodiment of FIG. 1. The circuit of FIG. 5 additionally includes a feed-forward circuit enclosed by broken lines 31 including a half-silvered mirror 40 disposed in the path of the laser from source 100 whose intensity is modulated by a radial compensator 101 to cause the light intensity to decrease with the shifting of the point of incidence of the information-carrying laser beam on the record disc (not shown). The mirror 40 transmits a greater part of the input energy to the light modulator 10 and reflects a fraction of the incident light to a photoelectrical transducer 42 where the incident light energy is converted into corresponding electrical energy and then fed into the noninverting input of a comparator 44 for comparison with a fixed voltage reference $V_1$ from source 48 representing the integrator 20 output which is obtained when the bias point is controlled at the normal voltage $V_0$. The voltage level of the transducer 42 may be amplified by an amplifier 43 such that the amplified voltage corresponds to the mean value of the modulated light energy when the bias point is held at $V_0$. The output from the amplifier 43 is at the same voltage level as that derived from the integrator 20 only when the light modulator 10 is controlled at the normal bias potential. Therefore, the output from the comparator 44 represents the deviation of the average light energy from the reference voltage $V_1$, which deviation signal is applied to an adder 46 where it is combined additively with the reference voltage $V_1-V_0$ from the source 21. The result of the summation is coupled to the inverting input of the comparator 28 for comparison with the output from the adder 46.

It is assumed, in operation, that the input light has decreased in intensity from the initial level so, that the output from the integrator 20 has correspondingly decreased to $V_1-\Delta V'$. The amplifier 43 will correspondingly provide a voltage signal $V_1-\Delta V'$ and as a result the comparator 44 delivers an offset voltage $-\Delta V'$. The output from the adder 46 is thus $V_1-V_0-\Delta V'$. Comparator 23 computes the difference between the voltage signals from the integrator 20 and adder 46 to produce a voltage $V_0$. Therefore, the control point of the light modulator 10 is maintained at the same value regardless of the variation of input light energy.

It is understood from the above that the bias control point is shifted in response to the shifting of the operating curve due to the heat generated in the light modulator 10 while the operating point is maintained constant regardless of the variation of the average light intensity so that average energy of the modulated beam is decreased with time in correspondence with the decrease in input light energy, while the degree of intensity modulation is held constant regardless of the effect of radial compensation.

It is obvious for those skilled in the art to modify the circuit of FIG. 3 in a manner as shown in FIG. 5 to eliminate the disadvantage caused by radial compensation.

What is claimed is:

1. A circuit arrangement for controlling the bias potential of a light modulator disposed in the path of a laser beam to modulate the energy thereof in accordance with a modulating electrical signal, wherein said light modulator has an operating characteristic which varies as a function of a biasing potential applied thereto and wherein the intensity of said laser beam has a tendency to vary as a function of time, comprising:

means disposed in the path of the modulated beam for transmitting a fraction of said beam to utilization means and reflecting the other fraction of said beam;

means responsive to said reflected laser beam for generating a second electrical signal representative of the mean value of the modulated energy of said laser beam;

means for generating a third electrical signal representative of the deviation of said second signal from a first reference value, said third signal being applied to said light modulator as said biasing potential;

means disposed in the path of said laser beam incident on said light modulator for reflecting a fraction of said beam and transmitting the other fraction of said beam to said light modulator;

means responsive to the last-mentioned reflected beam for generating a fourth electrical signal which is a replica of the intensity of said beam; and means for generating a fifth electrical signal representative of the deviation of said fourth signal from a second reference value for cancelling an error present in said modulated light energy as a result of said variation of the intensity of said laser beam.

2. A circuit arrangement as claimed in claim 1, wherein said means for generating a third electrical signal comprises means for setting a reference potential representing said first reference value and a comparator having a first input responsive to the output from said second signal generating means and a second input responsive to said reference potential to derive an output representing the difference between said second signal and said reference potential.

3. A circuit arrangement as claimed in claim 2, wherein the operating characteristic of said light modulator is such that the modulated light energy decreases as the modulating signal increases in amplitude, and wherein said reference potential represents $V_1 - V_0$ where $V_1$ represents said mean value of said modulated light energy which is produced when said light modulator is operated at a given biasing potential and $V_0$ represents said given biasing potential, and wherein said comparator has a noninverting input responsive to said reference potential representing $V_1 - V_0$.

4. A circuit arrangement as claimed in claim 2, wherein the operating characteristic of said light modulator is such that the modulated light energy increases as the modulating signal increases in amplitude, and wherein said reference potential represents $V_1 + V_0$ where $V_1$ represents said mean value of said modulated light energy which is produced when said light modulator is operated at a given biasing potential and $V_0$ represents said given biasing potential, and wherein said comparator has a noninverting input responsive to said reference potential representing $V_1 + V_0$ and an inverting input responsive to said second electrical signal.

5. A circuit arrangement as claimed in claim 1, wherein said second signal generating means comprises a photoelectrical transducer responsive to the first-mentioned reflected laser beam to generate a signal which is a replica of said modulating electrical signal, and an integrator having a time constant value greater than a time interval corresponding to the lowest frequency of said modulating signal and connected to be responsive to the output signal from said photoelectrical transducer.

6. A circuit arrangement as claimed in claim 3, wherein said second reference value corresponds to said mean value of said modulated light energy which is produced when said light modulator is operated at said given biasing potential.

7. A circuit arrangement as claimed in claim 4, wherein said second reference value corresponds to said mean value of said modulated light energy which is produced when said light modulator is operated at said given biasing potential.

8. A circuit arrangement as claimed in claim 1, further comprising means for algebraically combining said fifth signal with one of said second and third signals to cancel said error produced in said modulated light energy.

* * * * *